J. D. HILL.
VEHICLE WHEEL RIM SCRAPER.
APPLICATION FILED APR. 11, 1917.
1,259,865.
Patented Mar. 19, 1918.
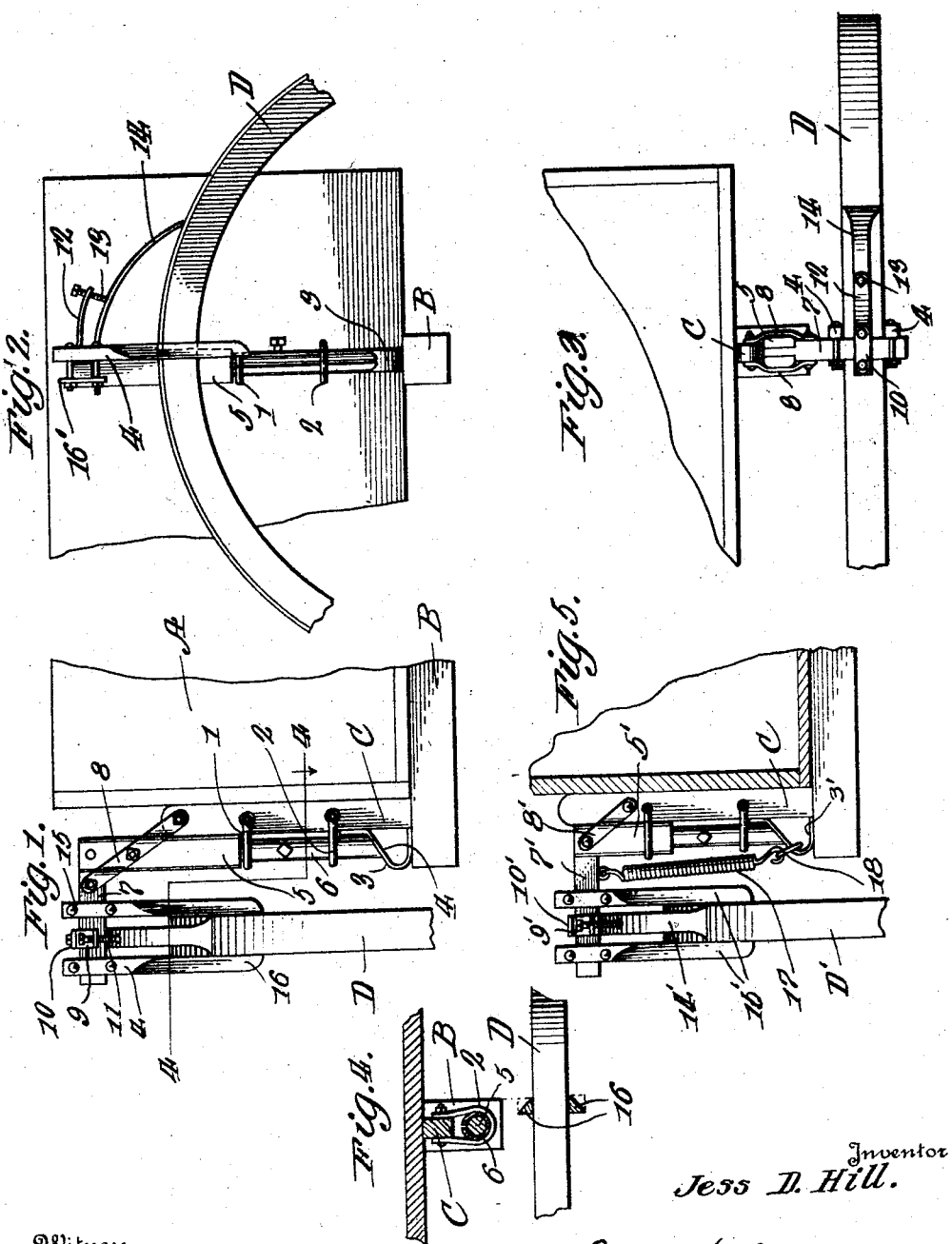
Witness
Guy M. Spring
Wm H Mulligan
Inventor
Jess D. Hill.
By 
Attorney

UNITED STATES PATENT OFFICE.

JESS D. HILL, OF SULPHUR, OKLAHOMA.

VEHICLE-WHEEL-RIM SCRAPER.

1,259,865.  Specification of Letters Patent.  Patented Mar. 19, 1918.

Application filed April 11, 1917. Serial No. 161,256.

*To all whom it may concern:*

Be it known that I, JESS D. HILL, a citizen of the United States, residing at Sulphur, in the county of Murray and State of Oklahoma, have invented certain new and useful Improvements in Vehicle-Wheel-Rim Scrapers, of which the following is a specification.

This invention relates to a vehicle wheel rim scraper and more particularly to a device adapted to be attached to a wagon and associated with the wheels thereof whereby mud or other similar substance that is likely to adhere to the wheel may be thoroughly removed from the rim of the wheel while the same is in motion.

One of the objects of the invention is to provide a device that will thoroughly remove all mud and other foreign substances from the rim and sides of the felly of the wheel so that the wheel will be less likely to embed itself in muddy or soft ground while the vehicle is being drawn from the same.

A further object of the invention is to provide a device of this character having means for permitting an adjustment of the scraper elements so that the proper pressure may be maintained for effectively removing the mud from the rim and sides of the felly of the wheel.

Another object of the invention is the provision of a device of this character having a novel method of attaching the same to the wagon body whereby the scraper elements may be properly disposed with respect to the vehicle wheel.

A further object of this invention is the provision of a vehicle wheel rim scraper which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a fragmentary rear end elevation of a wagon showing the invention applied thereto.

Fig. 2 is a fragmentary side elevation of a wagon showing the invention applied thereto, Fig. 3 is a top plan view.

Fig. 4 is a detail section taken on the line 4—4 of Fig. 1, and

Fig. 5 is a view similar to Fig. 1 showing a slightly modified construction.

Referring to the drawing, wherein is illustrated the preferred form of my invention, and in which like numerals of reference indicate corresponding parts throughout the several views, the wagon body A is mounted upon a bolster B in the usual manner. At the end of the bolster, which projects outwardly beyond the side of the wagon body, is the usual standard C which is in contact with the side of the wagon body in the usual manner. The wheel D is, of course, mounted upon the axle of the wagon and is spaced from the body of the wagon in about the proportion shown by the drawing.

Attached to the standard C is a pair of longitudinally projecting yokes 1 and 2 the terminals of which are provided with openings through which suitable fastening elements are projected and engaged with the standard C for attaching the yokes to the standard. A brace member 3 is constructed from suitable strap iron and is formed, as clearly shown by Fig. 1 of the drawing with an angularly disposed portion 4 having one end bent to contact with the standard C and the same is fastened thereto with any suitable fastening element. The opposite end of the angularly disposed portion is curved inwardly and rests upon the top surface of the extended end of the bolster B. This brace member has a purpose and serves a function that will more clearly appear as the description progresses. A supporting standard 5 is of substantially rectangular configuration in cross-section at its upper end, this square or rectangular portion taking about half the length of the said standard while the remaining portion of the standard is of cylindrical formation and is extended into a sleeve 6 adapted to be embraced by the yokes 1 and 2. The lower end of the sleeve 6 which embraces the said cylindrical portion is beveled for contacting with the angularly disposed portion 4 of the brace member 3. This construction permits the supporting standard to be held in the proper position when its end is in engagement with the brace member 3 and the angular disposition of the contacting end of the standard prevents rotary movement of the supporting standard. The upper end of the supporting standard 5 carries a right angularly projecting retaining arm 7 which projects out toward the wheel D and is braced against accidental displacement by two pieces of strap iron 8 which have their intermediate portions fastened adjacent the upper end of the supporting standard and their upper ends connected to the arm 7. The lower ends of the strap iron 8 are fastened to the upper end of the standard C thereby effectively bracing the supporting standard 5 and the arm 7.

Fastened to the arm 7 at a point directly above the wheel D is a clamp 9 comprising an upper portion 10 and a lower portion 11. The upper portion 10 of the clamp is extended out over the wheel as clearly shown by Fig. 2 of the drawing to provide a spring member 12 having an adjusting screw 13 screw threadedly mounted in its terminal. The lower portion 11 of the clamp 9 is also provided with an extension which is considerably longer than the extension 12 and which is of arcuate formation so that its terminal is in engagement with the rim of the wheel thereby providing a scraper blade 14 for the wheel rim. The terminal of the scraper blade is flared outwardly to increase the width of the same so that the entire surface of the wheel rim may be scraped. It is obvious that when the adjusting screw 13 is extended through the member 12 to a greater or less distance, the pressure of the scraper element 14 on the wheel rim may be correspondingly adjusted.

Mounted on the arm 7, at each side of the clamp member 9, is another scraper member 15 which consists of a scraper blade 16 disposed vertically and in contact with the sides of the wheel felly. The upper end of each scraper member 15 is provided with a pair of fastening bolts, embracing the upper and lower sides of the arm 7 and connected to a clamp plate 16′ which contacts with the arm 7 thereby fastening each scraper blade 15 to the arm. Fig. 4 of the drawing clearly shows the two scraper members 16 and it will be obvious that when the wheel is covered with mud and the wagon is put in motion, the rotation of the wheels will cause the scraper elements 14 and 15 to act upon the rim and sides of the felly of the wheel so that the mud will be thoroughly removed. This will permit the wagon to more freely be drawn through muddy ground such as is found in certain parts of the country. The burden of the team drawing the wagon will be greatly lightened since it is well known that in some sections of the country or what is termed the "black mud sections" it is often necessary to obtain the assistance of an extra team of draft animals to haul a wagon from the mud because of the fact that the wheels are so thoroughly caked and covered with the mud that they will not readily turn without excessive pulling power being applied to the wagon.

In Fig. 5 I have shown a slightly modified construction of the device and in this instance the strap irons 8′ are much shorter in length than the strap irons 8 of the above described form and are fastened to the upper end of the standard C and also to the upper end of the supporting standard 5′. This device is intended for use more especially with the front wheels of the vehicle or wagon and it will be observed that the scraper elements 14′ and 15′ must be lowered to engage the smaller wheel d′. Furthermore, this construction permits relative movement of the scraping device with respect to the periphery of the wheel which will occur when the wagon is fitted with wagon springs for absorbing jar and vibration. To assist in holding the scraper elements 14′ and 15′ in their proper relative positions during the spring action of the wagon body, I have provided a coil tension spring 17 having one terminal fastened to the arm 7′ and the opposite terminal provided with a hook adapted to be releasably engaged with a ring 18 carried by the brace member 3′. Therefore, when the wagon body moves up and down due to vibration thereof, the spring 17 will tend to hold the scraper elements in the proper engagement for performing their prescribed function.

From the foregoing it will be observed that a very simple and durable vehicle wheel rim scraper has been provided, the details of which embody the preferred form. I desire it to be understood however, that slight changes in the minor details of construction may be made without departing from the spirit of the invention or the scope of the claims hereunto appended.

I claim:

1. In combination with a wagon standard and a wagon wheel, a supporting standard fixed to the wagon standard and including a cylindrical sleeve having one end beveled, an angularly disposed brace fixed to the wagon standard and engaged by the beveled end of the said sleeve, scraper elements supported by the upper end of the supporting standard and provided with a retaining arm carried by the said wagon standard, and means for adjusting the tension of the said scraper elements.

2. In combination with a wagon standard and a wagon wheel, a supporting standard carried by the wagon standard and including a cylindrical sleeve having one end beveled, an angularly disposed brace carried by the wagon standard and receiving the beveled end of the said sleeve and scraper elements supported by the upper end of the said supporting standard and engageable with the said wheel.

3. In combination with a wagon standard and a wagon wheel, a supporting standard carried by the wagon standard and including a sleeve having one end beveled, an angular brace carried by the wagon standard and engageable with the beveled end of the said sleeve, scraper elements supported by the upper end of the supporting standard, a retaining arm carried by the said standard and attached to the said scraper element, one of the said scraper elements including a clamp embracing the said retaining arm and having an arcuate extension terminating in engagement with the periphery of the wheel, and means carried by the clamp and engageable with the extension to adjust the pressure of the extension on the said wheel rim.

In testimony whereof I affix my signature in presence of two witnesses.

JESS D. HILL.

Witnesses:
FRED GAFFORD,
T. F. GAFFORD.

Copies of this patent may be obtained for five cents each, by addressing the "Commissioner of Patents, Washington, D. C."